3,442,607
ANTIMONY TETROXIDE PRODUCTION
Harry Ladenheim, Philadelphia, and Martin H. Ziv, Springfield, Pa., assignors to Air Products and Chemicals, Inc., Philadelphia, Pa., a corporation of Delaware
No Drawing. Filed Apr. 13, 1966, Ser. No. 542,215
Int. Cl. C01b 27/00
U.S. Cl. 23—144                                9 Claims The present invention relates to the production of high purity antimony tetroxide and more particularly, to the preparation of pure antimony tetroxide by the reaction of antimony trioxide with nitric acid.

Metallic antimony is ordinarily quite stable and is not readily attacked by air or moisture. However, under controlled conditions, it will react with oxygen to form the oxides $Sb_2O_3$, $Sb_2O_4$ and $Sb_2O_5$. The use of antimony metal for producing antimony tetroxide is relatively expensive and consequently antimony tetroxide is normally prepared for use as a pigment in ceramics and paints by heating antimony trioxide in air at temperatures in the range of 300 to 600° C. Although antimony tetroxide is obtained by air oxidation, sintering occurs at the temperatures required for such oxidation resulting in antimony tetroxide of reduced surface area. Moreover, at temperatures below about 500° C. it is difficult to obtain antimony tetroxide completely free of antimony trioxide by air oxidation methods.

It has now been discovered that antimony tetroxide, free of antimony trioxide, can be prepared by reacting antimony trioxide with nitric acid of at least 45 weight percent concentration. Sintering is avoided using this procedure and antimony tetroxide is obtained which has a fine particle size and high surface area.

In accordance with the present invention, antimony trioxide is placed in a container with nitric acid having at least a 45 weight percent concentration. Preferably, the nitric acid employed is preheated to at least 70° C. in that the antimony trioxide disperses more readily when introduced to preheated acid. Excess nitric acid is used to insure complete oxidation and usually the molar ratio of nitric acid to antimony trioxide is 4 to 1 or preferably higher, such as 6 or more to 1. This mixture is maintained at a temperature of approximately 100° C. and preferably at least 104° C. or higher until conversion of antimony trioxide to antimony tetroxide is complete as may be demonstrated by X-ray diffraction analysis. At atmospheric pressure conditions the temperature is generally at or just below the boiling point of the liquid and temperatures may be as high as 125° to 130° C. At these conditions the reaction is usually effected in a vessel provided with a condenser system to prevent undue loss of liquid. It is possible to maintain liquid amount and acid concentration by controlled addition of acid during the reaction if desired or required. Likewise it is possible to effect the reaction in a closed system at autogenous or even higher pressure if higher temperature operation with little if any liquid loss seems desired.

Although stirring is not required, agitation will improve the contact of solids and liquid and thereby reduce the duration of the reaction. Such agitation is, of course, facilitated by higher liquid to solid ratios. Alternatively, a lower initial liquid to solids ratio, e.g., a liquid to solids ratio in the range of 2 to 1, may be used if it is maintained relatively constant such as in a closed system at controlled pressure by periodic additions of nitric acid to the heated mixture.

The duration of the reaction also may be reduced by employing the highest concentration of the acid which is normally available and maintaining the mixture at approximately the boiling temperature of the acid. For example, using 70 weight percent nitric acid at 120° C. and a 5 to 1 liqiud to solids ratio antimony trioxide will be completely converted to antimony tetroxide in about four to six hours whereas using 45 weight percent nitric acid at 100° C. and a 3 to 1 liquid to solids ratio the duration of this reaction is extended to about 40 hours. Using 62 to 70 weight percent nitric acid at 110° C. in an amount yielding a liquid to solids ratio of 2.5 to 1 with a molar ratio of nitric acid to antimony trioxide of about 8 to 1, complete conversion to antimony tetroxide is obtained in 14 hours. At acid concentration below 45 weight percent the duration of the reaction required for complete conversion of antimony trioxide to antimony tetroxide is not commercially practical.

During the course of the conversion, a particle size reduction occurs as a manifestation of the reaction. The extent of the reaction may be followed by X-ray diffraction analysis because the patterns of the cubic and orthorhombic forms of antimony trioxide are distinct from the orthorhombic X-ray pattern of antimony tetroxide.

Upon completion of the conversion of antimony trioxide to antimony tetroxide, nitric acid is separated from the antimony tetroxide particles as by filtration, and said particles are then washed with water and finally dried at a temperature which may be between 70 to 900° C. but is preferably between about 70 to about 200° C. No appreciable reduction in surface area occurs even when the antimony tetroxide is heated to 900° C. In comparison reduction in the surface area of antimony trioxide will occur at temperatures at about 500° C.

While it is possible to separate the product antimony tetroxide from the nitric acid treating liquid as described above it may be desirable for various reasons such as to minimize demands for corrosion resistant equipment or improve ease of handling to effect with care a degree of neutralization by addition of any suitable base, such as sodium hydroxide, potassium hydroxide or ammonium hydroxide. In a preferred embodiment such a base is added to the nitric acid-antimony tetroxide admixture in an amount sufficient to bring the admixture to a pH between about 7 to 10. After such neutralization the antimony tetroxide is separated, as by filtration, centrifuging or the like, and then washed or otherwise freed of salts and extraneous materials. Further treatment of the antimony tetroxide may be as described above, e.g., dried and calcined.

The invention is further clarified by the following examples:

EXAMPLE I 461 cubic centimeters of nitric acid, having a 70 weight percent concentration, was heated to 100° C. in a vessel fitted with a reflux condenser. 270 grams of antimony trioxide, having a particle size distribution within about 6 to about 20 microns with 80% of the particles being finer than 14 microns, was then added to the vessel. Dark fumes began to evolve from the vessel almost immediately and the temperature of the mixture was increased to 120° C.

After 8 hours, a sample was removed from the vessel and neutralized to a pH of 7.6 by the addition of ammonium hydroxide. The neutralized material was then filtered and washed twice with 200 cu. centimeters of distilled water. A white colloidal solids product was recovered by slow filtering. 80% of the resulting material was found to have a particle size smaller than 11 microns. X-ray diffraction analysis of this white product showed the presence of only antimony tetroxide.

EXAMPLE II 512 cubic centimeters of nitric acid, having a 70 weight percent concentration, was charged to a vessel and heated to 80° C. Upon addition of 300 grams of antimony trioxide to the vessel, the temperature of the admixture was increased to 106° C.

After 24 hours at 106° C. the admixture was cooled and neutralized with ammonium hydrxoide to a pH of 8.0. The resulting material was then filtered. The filter cake was washed with 150 cu. centimeters of distilled water and then dried at 121° C. for 15 hours. X-ray analysis of the product showed the presence of only antimony tetroxide.

EXAMPLE III 3820 grams of 70 weight percent nitric acid was heated to 82° C. in a vessel. 950 grams of antimony trioxide was then added to the vessel and the resulting admixture was maintained at 104° C. for 14 hours.

The admixture was cooled and neutralized with ammonium hydroxide to a pH of 8.0. The resulting material was then filtered; and the filter cake was washed twice with 150 cu. centimeters of distilled water and dried at 121° C. for 12 hours. The presence in the product of only antimony tetroxide was shown by X-ray analysis.

EXAMPLE IV 3420 grams of 70 weight percent nitric acid and 321.8 grams of distilled water are mixed to obtain nitric acid having a concentration of 64 weight percent which is then heated to 82° C. 950 grams of antimony trioxide is added to the preheated acid and the admixture, maintained at 104° C., is stirred for 24 hours.

Antimony tetroxide resulting from this reaction is separated from the acid and dried at about 70° C. for 24 hours. Antimony tetroxide obtained by this procedure, by X-ray diffraction analysis, is free of antimony trioxide.

EXAMPLE V 2331.7 grams of 70 weight percent nitric acid is added to 1141.1 grams of water to obtain 47 weight percent nitric acid which is preheated to 75° C. 950 grams of antimony trioxide is then added proportion-wise to the preheated acid. This admixture is maintained at 104° C. for 35 hours. At the end of this period the mixture is allowed to settle and the bulk of the acid is removed by decantation. The remaining material is neutralized to a pH of 8 with sodium hydroxide and filtered. The filter cake is washed until salt-free and is then dried. After drying for 6 hours at 200° C., the resulting material by X-ray analysis shows antimony tetroxide free of antimony trioxide.

Obviously, many modifications and variations of the invention as hereinbefore set forth may be made without departing from the spirit and scope thereof, and therefore only such limitations should be imposed as are indicated in the appended claims.

What is claimed is:

1. A method of producing pure antimony tetroxide comprising, reacting antimony trioxide with nitric acid of at least 45 weight percent concentration and in stoichiometric excess of the amount required for conversion of the animony trioxide to animony tetroxide for a time period of at least four hours at a temperature of at least 100° C. to obtain conversion of the antimony trioxide to antimony tetroxide, and thereafter separating and recovering substantially pure antimony tetroxide.

2. The method of claim 1 wherein the nitric acid is present in an amount of liquid sufficient to provide a liquid to solids, measured as the antimony trioxide, ratio of at least two parts of liquid per part of solids.

3. The method of claim 1 wherein the nitric acid is present in an amount providing a molar ratio of nitric acid to animony trioxide of at least 6 to 1.

4. The method of claim 1 wherein the nitric acid is preheated to a temperature of at least 70° C. prior to reacting said acid with the antimony trioxide.

5. The method of claim 1 wherein the nitric acid and animony trioxide are reacted at a temperature of at least 104° C.

6. The method of claim 1 wherein the separating and recovery of the antimony tetroxide includes the steps of neutralizing the acid admixture by addition of a base, sequestering solid animony tetroxide from said-neutralized acid, washing and drying said solid, and recovering dried solid antimony tetroxide.

7. The method of claim 6 wherein the acid admixture is neutralized to a pH between 7 and 10 by addition of the base, said base being ammonium hydroxide.

8. The method of claim 1 wherein the separated and recovered antimony tetroxide is dried at a temperature of at least 100° C. for at least 6 hours.

9. The method of claim 1 wherein said acid concentration is in a range of 62 to 70% $HNO_3$ and in an amount yielding a liquid to solids ratio of 2.5 to 1 with a molar ratio of $HNO_3$ to antimony trioxide of 8 to 1; and the reacting conditions include a temperature of about 110° C. and a time of about 14 hours.

References Cited

UNITED STATES PATENTS 2,258,441  10/1941  Bozarth _____ 23—144

FOREIGN PATENTS 1,365,111  5/1964  France.

OSCAR R. VERTIZ, *Primary Examiner.*

HOKE S. MILLER, *Assistant Examiner.*

PO-1050
(5/69)

UNITED STATES PATENT OFFICE
CERTIFICATE OF CORRECTION

Patent No. 3,442,607      Dated May 6, 1969

Inventor(s) Harry Ladenheim and Martin H. Ziv

It is certified that error appears in the above-identified patent and that said Letters Patent are hereby corrected as shown below:

Column 2, line 66, "diffraction" should read --diffractional--.

Claim 1, line 5 thereof, "animony", both occurrences, should read --antimony--.

Claim 3, line 1 thereof, the number "1" should read --2--.

Claim 5, line 2 thereof, "animony" should read --antimony--.

Claim 6, line 4 thereof, "animony" should read --antimony--.

SIGNED AND SEALED

MAR 10 1970

(SEAL)
Attest:

Edward M. Fletcher, Jr.
Attesting Officer

WILLIAM E. SCHUYLER, JR.
Commissioner of Patents